United States Patent
Xia et al.

(10) Patent No.: US 10,289,293 B2
(45) Date of Patent: May 14, 2019

(54) METHOD AND APPARATUS FOR ADJUSTING A GRAPHICAL OBJECT ACCORDING TO OPERATOR PREFERENCE

(71) Applicant: SPREADTRUM COMMUNICATIONS (SHANGHAI) CO., LTD., Pudong New Area, Shanghai (CN)

(72) Inventors: Lu Xia, Shanghai (CN); Linna Yin, Shanghai (CN)

(73) Assignee: Spreadtrum Communications (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/118,059

(22) PCT Filed: May 10, 2013

(86) PCT No.: PCT/CN2013/075463
§ 371 (c)(1),
(2) Date: Nov. 15, 2013

(87) PCT Pub. No.: WO2013/189215
PCT Pub. Date: Dec. 27, 2013

(65) Prior Publication Data
US 2016/0054904 A1 Feb. 25, 2016

(30) Foreign Application Priority Data
Apr. 27, 2013 (CN) .......................... 2013 1 0153836

(51) Int. Cl.
G06F 3/00 (2006.01)
G06F 3/0484 (2013.01)
G06F 3/0482 (2013.01)
G06F 3/0488 (2013.01)

(52) U.S. Cl.
CPC ........ *G06F 3/04847* (2013.01); *G06F 3/0482* (2013.01); *G06F 3/04845* (2013.01); *G06F 3/04883* (2013.01)

(58) Field of Classification Search
CPC .................................................... G06F 3/0488
USPC .................................................. 715/738, 747
See application file for complete search history.

(56) References Cited

U.S. PATENT DOCUMENTS

| 6,373,501 B1 * | 4/2002 | Fiero ................... H04M 1/0281 |
| | | 345/168 |
| 7,263,667 B1 * | 8/2007 | Hoellerer ............... G01C 21/20 |
| | | 715/738 |
| 7,898,529 B2 * | 3/2011 | Fitzmaurice .......... G06F 3/0481 |
| | | 345/173 |
| 2010/0097331 A1 * | 4/2010 | Wu ....................... G06F 3/0488 |
| | | 345/173 |
| 2013/0127733 A1 * | 5/2013 | Krishnaswamy ... G06F 3/04883 |
| | | 345/173 |

* cited by examiner

*Primary Examiner* — Andrey Belousov
(74) *Attorney, Agent, or Firm* — Finnegan, Henderson, Farabow, Garrett & Dunner LLP

(57) ABSTRACT

A method for adjusting a graphical object according to operator preference is provided. The method includes: rendering a graphical object on a display screen of a handheld device; determining a preference setting indicating one of a left-handed preference or a right-handed preference for operating the handheld device; and adjusting the graphical object according to the preference setting.

16 Claims, 3 Drawing Sheets

METHOD AND APPARATUS FOR ADJUSTING A GRAPHICAL OBJECT ACCORDING TO OPERATOR PREFERENCE

FIELD OF THE DISCLOSURE

This disclosure relates to human-computer interfaces in general and to method and apparatus for adjusting a graphical object according to operator preference.

BACKGROUND OF THE DISCLOSURE

Human-computer interfaces provide important means for users to interact with a wide range of computing devices, such as desktop computers, laptop computers, tablet computers, smart phones, etc. Existing human-computer interfaces may include user input devices, such as a mouse, keyboard, or touchpad, which receive user inputs. For example, a conventional touchpad device may operate according to a multi-touch algorithm to detect a user's hand gestures. The conventional touchpad device may not, however, allow the user to configure the device to suit different preferences of different hands. Therefore, there is a need for a human-computer interface that may be configured to suit difference preferences by different users.

SUMMARY OF THE DISCLOSURE

In one embodiment, a method for adjusting a graphical object according to operator preference is provided. The method includes: rendering a graphical object on a display screen of a handheld device; determining a preference setting indicating one of a left-handed preference or a right-handed preference for operating the handheld device; and adjusting the graphical object according to the preference setting.

In another embodiment, a computer-readable medium is provided. The computer-readable medium includes instructions, which, when executed by a processor, cause the processor to perform a method for adjusting a graphical object according to operator preference. The method includes: rendering a graphical object on a display screen of a handheld device; determining a preference setting indicating one of a left-handed preference or a right-handed preference for operating the handheld device; and adjusting the graphical object according to the preference setting.

In still another embodiment, an apparatus for adjusting a graphical object according to operator preference is provided. The apparatus includes: a storage module configured to store instructions; an input module configured to receive user inputs; an output module configured to generate a graphical user interface including a plurality of graphical objects; and a processor configured to determine a preference setting indicating one of a left-handed preference or a right-handed preference for operating the apparatus and adjust the graphical objects according to the preference setting.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented or stated. The implementations set forth in the following description of exemplary embodiments do not represent all implementations consistent with the invention. Instead, they are merely examples of systems and methods consistent with aspects related to the invention as recited in the appended claims.

Figure 1:
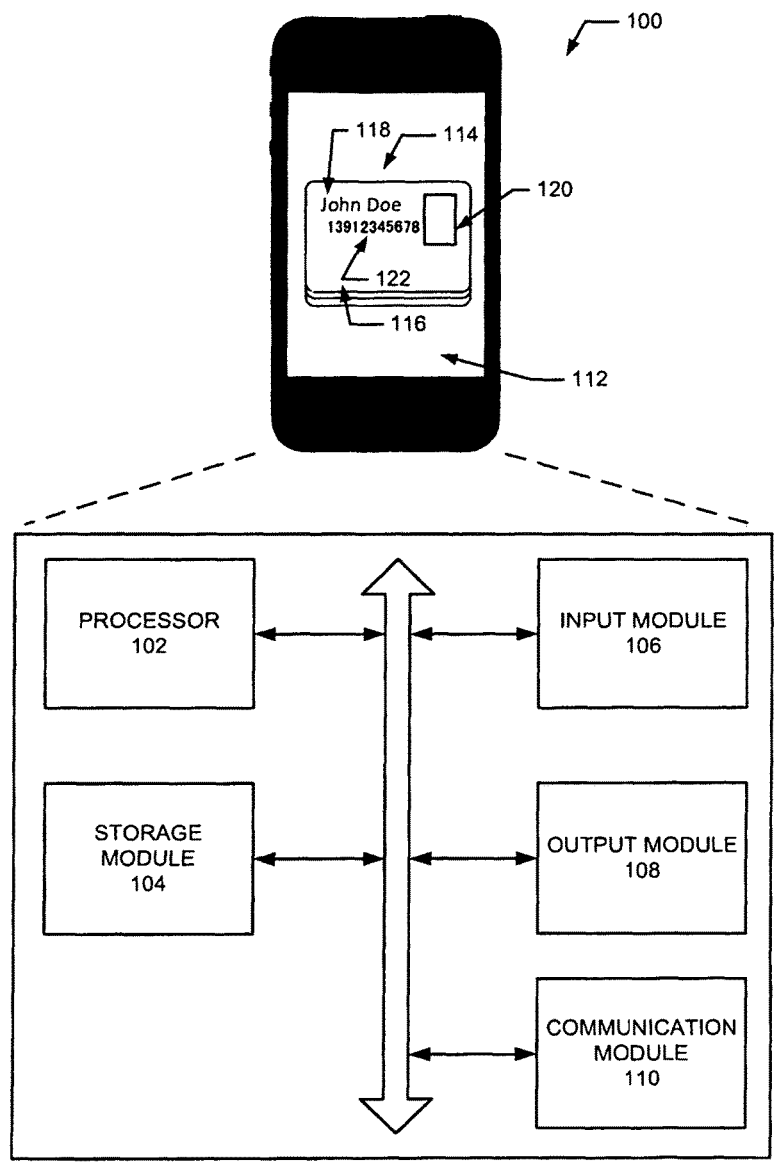
FIG. 1 is a schematic diagram of a computing device according to one embodiment.

FIG. 1 illustrates an exemplary computing device 100 that may be adjusted according to a user's preference, according to an embodiment. Computing device 100 may be a desktop, laptop, smart phone, tablet, or other computing device known in the art. More particularly, device 100 includes a processor 102, also known as a central processing unit (CPU), a storage module 104, an input module 106, an output module 108, and a communication module 110. Processor 102 may be an INTEL processor, an AMD processor, or any other processing unit known in the art, and configured to process user inputs and execute computer-executable instructions to operate device 100.

Storage module 104 may include a hard drive, a flash drive, an optical drive, a random-access memory (RAM), a read-only memory (ROM), or any other computer-readable medium known in the art. Storage module 104 is configured to store data and the computer-executable instructions relevant to the operation of device 100. Storage module 104 also stores computer-executable instructions associated with a plurality of applications. The applications, when executed by processor 102, cause device 100 to operate as the user desires. The user may select the applications to perform functions including, for example, making telephone calls, playing music or videos, navigating, etc.

Input module 106 may include a keyboard, a keypad, a mouse, a joystick, a button, a thumbwheel, a touch screen, or any other input device, which is configured to receive inputs from a user. In one embodiment, input module 106 includes a touch screen 112, which is configured to detect the user's hand gestures or hand motions and convert the user's hand gestures or hand motions to electronic signals for controlling the operation of device 100.

Output module 108 may include a display device, a speaker, a vibration generator, or other output device. Output module 108 is configured to provide the user with user feedback. For example, the display device can be coupled to processor 102 to receive signals and generate a graphical user interface including a plurality of graphical elements. The graphical elements may include icons associated with the individual applications stored in storage module 104. When the user selects an application to execute, processor 102 executes the selected application and cause the display device to generate graphical interfaces relevant to the application. According to a further embodiment, touch screen 112 is configured to operate as input module 106 as well as output module 108. Touch screen 112 receives user inputs through the hand motions of the user and generates user outputs through the graphical interfaces displayed thereon.

Communication module 110 may be configured to communicate with a telephone network, a wireless cellular network, or a computer network as known in the art. For example, communication module 110 may include a modem configured to provide network communication with a telephone network or a wireless cellular network. Alternatively, communication module 110 may include an Ethernet interface, a Wi-Fi interface, or a Bluetooth interface to provide network communication with an Ethernet, a local area network (LAN), a wide area network (WAN), or any other computer networks.

According to a further embodiment, when the user operates device 100 through touch screen 112 by using, for example, hands or fingers, processor 102 detects a particular motion of the user's hands or fingers according to the electronic signals generated by touch screen 112. For example, based on the electronic signals generated by touch screen 112 in response to such motion, processor 102 detects a swiping motion, a circular motion, or a tapping motion of the user's hands or fingers with respect to touch screen 112. Processor 102 then interprets the detected motions and generates control signals corresponding to the detected motions to control the operation of device 100.

According to a further aspect of the disclosure, processor 102 determines a preference setting of device 100 indicating whether the user operates device 100 under a right-handed preference or a left-handed preference. For example, when device 100 is a handheld computing device, such as a smart phone or a tablet, the user may prefer to or be required to operate device 100 using only the right hand or the left hand through touch screen 112.

Figure 2B:
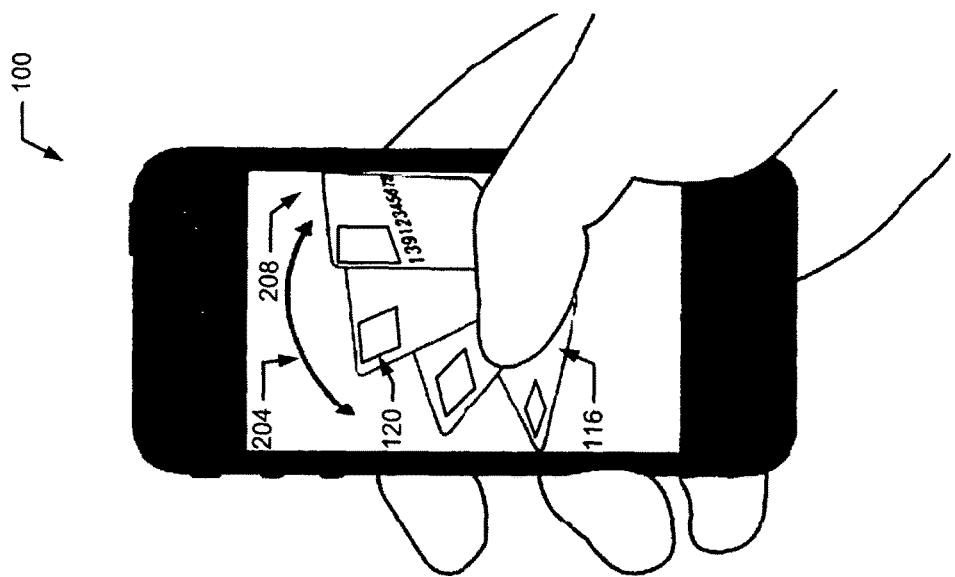
FIG. 2B illustrates operation of the computing device by a right-handed user.
Figure 2A:
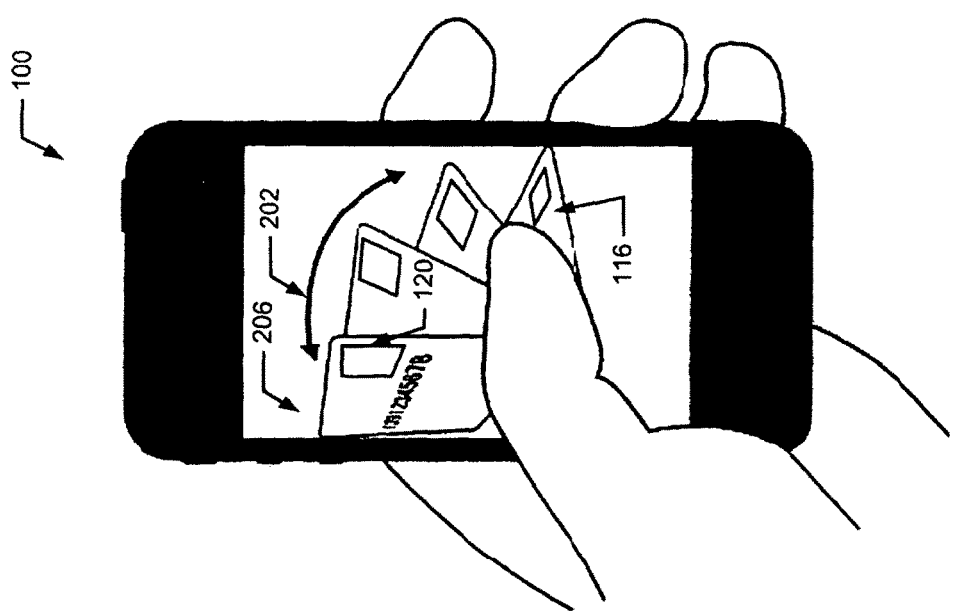
FIG. 2A illustrates operation of the computing device by a left-handed user.

According to one embodiment, processor 102 determines the preference setting based on the motions of the user's fingers with respect to touch screen 112. As shown in FIGS. 2A and 2B, for example, when the user operates device 100 using only the left hand (FIG. 2A) or the right hand (FIG. 2B), the left hand or right hand generates different motions 202 and 204, respectively, due to their physical and mechanical limitations. Thus, by analyzing motions 202 and 204, processor 102 determines whether the user uses the left hand or the right hand to operate device 100.

According to another embodiment, processor 102 determines whether the user intends to operate device 100 under the right-handed preference or the left-handed preference based on a user input. For example, processor 102 causes touch screen 112 to display a user interface for the user to set the preference setting to the right-handed preference or the left-handed preference. According to this embodiment, the user interface includes a menu, a check box, or a button for the user to select the preference setting. Upon receiving the user selection, processor 102 interprets the motions detected by touch screen 112 according to the selected preference setting.

According to a further aspect of the disclosure, processor 102 adjusts the operation of device 100 according to the preference setting. For example, upon detecting the preference setting, processor 102 adjusts the graphical user interface generated by touch screen 112 to suit the selected preference and allow the user to operate device 100 using the left hand or the right hand relatively easier and more efficiently.

Referring back to FIG. 1, for example, processor 102 executes an application installed on device 100 and causes touch screen 112 to display a graphical object 114 including a plurality of elements 116. According to one embodiment, each element 116 of graphical object 114 is a simulated contact card including contact information of a person or entity associated with the user. The contact information includes, for example, a name 118, a photo 120, a telephone number 122, an email address, or other information of the person or entity. Thus, graphical object 114 may be a simulated business card holder, which allows the user to flip through elements 116 by swiping a finger across touch screen 112. Alternatively, graphical object 114 is a simulation of a book, a calendar, or a note pad including a plurality of pages presented by individual elements 116.

When graphical object 114 is initially generated, touch screen 112 displays individual elements 116 in a front view with the top element shown in its entirety and other elements obscured in part or in whole by the top element. Referring to FIGS. 2A and 2B, upon determining the preference setting, processor 102 adjusts graphical object 114 to a different view according to the preference setting. For example, when processor 102 detects the left-handed preference indicating that the user operates device 100 using only the left hand (FIG. 2A), processor 102 adjusts graphical object 114 to a left-handed oblique view 206 by rotating object 114 to the left by a pre-configured angle. Thus, when the user swipes the thumb of the left hand across touch screen 112, processor 102 causes individual elements 116 to flip in succession accordingly. Since object 114 is rendered in left-handed oblique view 206, the motion of individual elements 116 is consistent with the swiping motion of user's left hand as if the user is manipulating a stack of the physical card objects or paper documents.

Similarly, when processor 102 detects the right-handed preference indicating that the user operates device 100 using only the right hand (FIG. 2B), processor 102 adjusts graphical object 114 to a right-handed oblique view 208 by rotating object 114 to right by a pre-configured angle. Thus, when the user swipes the thumb of the right hand across touch screen 112, processor 102 causes individual elements 116 to flip accordingly. Since object 114 is rendered in right-handed oblique view 208, the motion of individual elements 116 is consistent with the swiping motion of user's right hand as if the user is manipulating a stack of physical card objects or paper documents.

According to a further aspect of the disclosure, processor 102 determines the pre-configured angle based on a value provided by the user. Processor 102 causes touch screen 112 to display a user interface for the user to input the value for the pre-configured angle. Alternatively, processor 102 determines the value for the pre-configured angle according to the motion of the user's hand. For example, when the motion of the user's hand is relatively small, processor 102 sets a relatively smaller value for the pre-configured angle. When the motion of the user's hand is relatively large, processor 102 sets a relatively larger value for the pre-configured angle.

According to a still further aspect of the disclosure, processor 102 causes touch screen 112 to display a three-dimensional (3D) scene including a plurality of 3D objects. The 3D objects may be individually adjusted according to the user's hand motion as described above. Each 3D object may be rendered in the front view, the left-handed oblique view, or the right-handed oblique view. Processor 102 further changes each of the 3D objects among different views. For example, when the user selects an object in the 3D scene by double tapping the selected object on touch screen 112, processor 102 changes the selected object from the front view to an oblique view or from one oblique view to another oblique view. Alternatively, processor 102 changes the view of the selected object when the user explicitly sets the preference setting to the left-handed preference or the right-handed preference. Still alternatively, processor 102 changes the view of the selected object upon detecting the motion made by the left hand or the right hand of the user.

Figure 3:
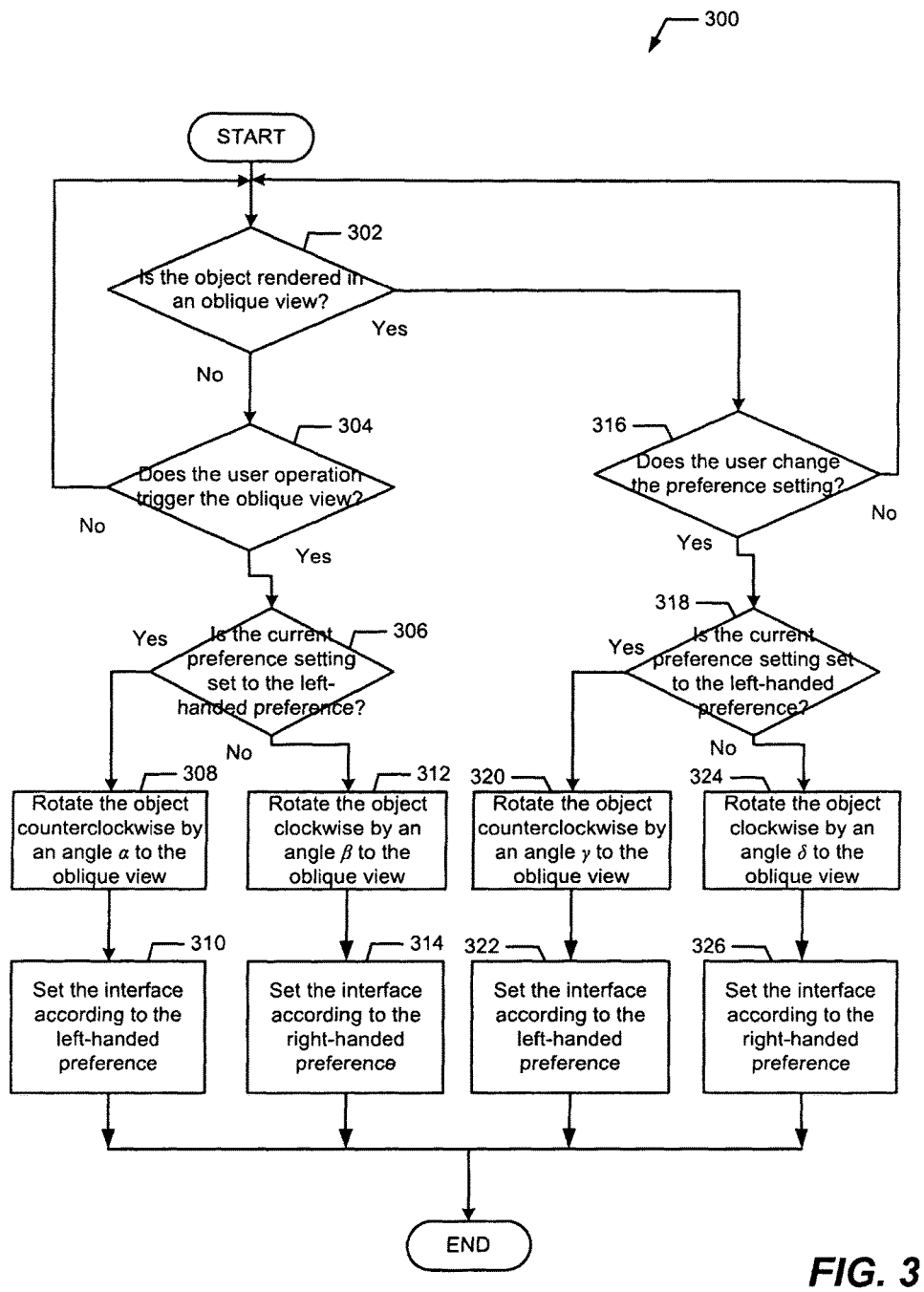
FIG. 3 illustrates a flow diagram of a process for adjusting the computing device according to a user's preference.

FIG. 3 depicts a flow chart of a process 300 for adjusting the operation of device 100 according to the user's preference. Process 300 is performed by processor 102 according to the computer-executable instructions in storage medium 104. According to process 300, at step 302, processor 102 determines whether a graphical object, such as object 114, is already rendered in an oblique view. More specifically, when the graphical object is initiated, it may be displayed in a front view. Alternatively, the graphical object may be initially displayed in the oblique view according to the preference setting pre-set by the user.

If processor 102 determines that the graphical object is not currently rendered in the oblique view ("No" at step 302), processor 102 further determines whether a user operation triggers the oblique view at step 304. The oblique view may be triggered by a variety of user operations as discussed above. For example, when the user selects the object by double tapping the selected object on touch screen 112, processor 102 changes the selected object from the front view to an oblique view. Alternatively, processor 102 changes the selected object from the front view to the oblique view when the user explicitly sets the preference setting to the left-handed preference or the right-handed preference. Still alternatively, processor 102 changes the selected object from the front view to the oblique view upon detecting the motion made by the left hand or the right hand of the user, causing the selected object to be moved within the 3D scene.

If processor 102 determines at step 304 that the user operation does not trigger the oblique view, process 300 proceeds back to step 302. If, on the other hand, processor 102 determines at step 304 that the user operation triggers the oblique view, processor 102 further determines whether the current preference setting is set to the left-handed preference at step 306. Processor 102 sets the current preference setting according to an explicit input from the user or according to the motions of the user's hands or fingers.

If processor 102 determines that the current preference setting is set to the left-handed preference at step 306, processor 102 then causes the selected object to be rotated to the left (i.e., counterclockwise when viewed from top) by an angle α to the left-handed oblique view (FIG. 2A) at step 308. The angle α is determined according to a user input or a pre-configured parameter.

At step 310, processor 102 further sets the graphical elements of the user interface according to the left-handed reference. For example, processor 102 re-arranges or relocates the icons, buttons, or menus of the user interface to an area of touchscreen 112 that are relatively easier to access by the user using the left hand. In one embodiment, the graphical elements of the user interface are relocated to the right side or the bottom-right corner of touchscreen 112, so that the user may access the graphical elements using the left thumb when operating device 100 using only the left hand. In another embodiment, as shown in FIG. 2A, photo 120 or other relevant contact information shown on each simulated contact card 116 is displayed on the right side of contact card 116 so that the user may view it when flipping through the simulated contact card holder.

If processor 102 determines that the current preference setting is not set to the left-handed preference at step 306, processor 102 then causes the selected object to be rotated to the right (i.e., clockwise when viewed from top) by an angle β to the right-handed oblique view (FIG. 2B) at step 312. Similarly to the angle α, the angle β is determined according to a user input or a pre-configured parameter. According to a further embodiment, the angle α and the angle β may be set to the same value.

At step 314, processor 102 further sets the graphical elements of the user interface according to the right-handed reference. For example, processor 102 re-arranges or relocates the icons, buttons, or menus of the user interface to an area of touchscreen 112 that are relatively easier to access by the user using the right hand. In one embodiment, the graphical elements of the user interface are relocated to the left side or the bottom-left corner of touchscreen 112, so that the user may access the graphical elements using the right thumb when operating device 100 using only the right hand. In another embodiment, as shown in FIG. 2B, photo 120 or other relevant contact information shown on each simulated contact card 116 is displayed on the left side of contact card 116 so that the user may view it when flipping through the simulated contact card holder.

Referring back to step 302, if processor 102 determines that the graphical object is already rendered in the oblique view according to the preference setting, process 300 proceeds to step 316. At step 316, processor 102 determines whether the user changes the preference setting between the left-handed preference and the right-handed preference. If the user does not change the preference setting ("No" at step 316), process 300 proceeds back to step 302. If, on the other hand, the user changes the preference setting ("Yes" at step 316), processor 102 determines whether the current preference setting is set to the left-handed preference at step 318.

If processor 102 determines that the current preference setting is set to the left-handed preference at step 318, processor 102 then causes the selected object to be rotated from right to left (i.e., counterclockwise when viewed from top) by an angle γ to the left-handed oblique view (FIG. 2A) at step 320.

At step 322, processor 102 further sets the graphical elements of the user interface according to the left-handed reference. For example, processor 102 re-arranges or relocates the icons, buttons, or menus of the user interface to an area of touchscreen 112 that are relatively easier to access by the user using the left hand. In one embodiment, the graphical elements of the user interface are relocated to the right side or the bottom-right corner of touchscreen 112, so that the user may access the graphical elements using the left thumb when operating device 100 using only the left hand. In another embodiment, as shown in FIG. 2A, photo 120 or other relevant contact information shown on each simulated contact card 116 is displayed on the right side of contact card 116 so that the user may view it when flipping through the simulated contact card holder.

If processor 102 determines that the current preference setting is not set to the left-handed preference at step 318, processor 102 then causes the selected object to be rotated from left to right (i.e., clockwise when viewed from top) by an angle δ to the right-handed oblique view (FIG. 2B) at step 324. Similarly to the angles α and β, the angles γ and δ are determined according to user inputs or pre-configured parameters. According to a further embodiment, the angles γ and δ may be set to the same value. According a still further embodiment, the angle α is one half of the angle γ, and the angle β is one half of the angle δ. According to a still further embodiment, the angles α, β, γ, and δ are set according to the perspective of the 3D scene rendered on touch screen 112. Thus, the rotation of the selected object is consistent with the perspective of the 3D scene as viewed by the user.

At step 326, processor 102 further sets the graphical elements of the user interface according to the right-handed reference. For example, processor 102 re-arranges or relocates the icons, buttons, or menus of the user interface to an area of touch screen 112 that are relatively easier to access by the user using the right hand. In one embodiment, the graphical elements of the user interface are relocated to the left side or the bottom-left corner of touch screen 112, so that the user may access the graphical elements using the right thumb when operating device 100 using only the right hand. In another embodiment, as shown in FIG. 2B, photo 120 or other relevant contact information shown on each simulated contact card 116 is displayed on the left side of contact card 116 so that the user may view it when flipping through the simulated contact card holder.

It will be appreciated that the present invention is not limited to the exact construction that has been described above and illustrated in the accompanying drawings, and that various modifications and changes can be made without departing from the scope thereof. Graphical object 114 is described for illustrative purposes only. The device and process described herein may be used to adjust any graphical elements of a user interface rendered on a screen, not limited to graphical object 114. It is intended that the scope of the invention only be limited by the appended claims.

What is claimed is:

1. A method for adjusting a graphical object according to operator preference, including:
   rendering a three-dimensional graphical object on a position of a display screen of a handheld device;
   determining a preference setting indicating one of a left-handed preference or a right-handed preference for operating the handheld device;
   when the left-handed preference is determined, rendering a left-handed oblique view of the object on the display screen by rotating the object, when viewed by an observer along an axis within the display screen, to a counterclockwise direction by a pre-configured angle relative to the position of the display screen; and
   when the right-handed preference is determined, rendering a right-handed oblique view of the object on the display screen by rotating the object, when viewed by an observer along the axis within the display screen, to a clockwise direction by the pre-configured angle relative to the position of the display screen,
   wherein the display screen is a touch screen, the determining of the preference setting includes determining the preference setting based on a motion of a finger of a user with respect to the touch screen, and the pre-configured angle is proportional to a magnitude of the motion of the finger with respect to the touch screen.

2. The method of claim 1, wherein the determining of the preference setting includes receiving a user input indicating the left-handed preference or the right-handed preference.

3. The method of claim 1, further comprising determining that the motion is associated with one of a left hand or a right hand of the user.

4. The method of claim 1, further comprising:
   detecting a change to the preference setting; and
   rotating the object by a predetermined angle in response to the change.

5. The method of claim 4, further comprising:
   detecting that the preference setting is changed to the left-handed preference; and
   rotating the object by the predetermined angle to left.

6. The method of claim 4, further comprising:
   detecting the preference setting is changed to the right-handed preference; and
   rotating the object by the predetermined angle to right.

7. The method of claim 1, further comprising:
   rendering a three-dimensional scene including a plurality of graphical objects;
   detecting a change of perspective of the three-dimensional scene;
   determining the preference setting in response to the change of the perspective; and
   adjusting each of the objects according to the preference setting.

8. The method of claim 1, wherein:
   the left-handed preference indicates operation by a user using only a left hand; and
   the right-handed preference indicates operation by the user using only a right hand.

9. A computer-readable medium including instructions, which, when executed by a processor, cause the processor to perform a method for adjusting a graphical object according to operator preference, the method comprising:
   rendering a three-dimensional graphical object on a position of a display screen of a handheld device;
   determining a preference setting indicating one of a left-handed preference or a right-handed preference for operating the handheld device;
   when the left-handed preference is determined, rendering a left-handed oblique view of the object on the display screen by rotating the object, when viewed by an observer along an axis within the display screen, to a counterclockwise direction by a pre-configured angle relative to the position of the display screen; and
   when the right-handed preference is determined, rendering a right-handed oblique view of the object on the display screen by rotating the object, when viewed by an observer along the axis within the display screen, to a clockwise direction by the pre-configured angle relative to the position of the display screen,
   wherein the display screen is a touch screen, the determining of the preference setting includes determining the preference setting based on a motion of a finger of a user with respect to the touch screen, and the pre-configured angle is proportional to a magnitude of the motion of the finger with respect to the touch screen.

10. The computer-readable medium of claim 9, wherein the method further comprises:
    detecting a change to the preference setting; and
    rotating the object by a predetermined angle in response to the change.

11. The computer-readable medium of claim 10, the method further comprising:
    detecting the preference setting is changed to the left-handed preference; and
    rotating the object by the predetermined angle to left.

12. The computer-readable medium of claim 10, the method further comprising:
    detecting the preference setting is changed to the right-handed preference; and
    rotating the object by the predetermined angle to right.

13. The computer-readable medium of claim 9, the method further comprising:
    rendering a three-dimensional scene including a plurality of graphical objects;
    detecting a change of perspective of the three-dimensional scene;

determining the preference setting in response to the change of the perspective; and adjusting each of the objects according to the preference setting.

14. The computer-readable medium of claim 9, wherein:
the left-handed preference indicates operation by a user using only a left hand; and
the right-handed preference indicates operation by the user using only a right hand.

15. An apparatus for adjusting a graphical object according to operator preference, including:
a storage module configured to store instructions;
an input module configured to receive user inputs;
an output module configured to generate a graphical user interface including a three-dimensional graphical object and to render the object on a position of a display screen; and
a processor configured to execute the instructions to:
determine a preference setting indicating one of a left-handed preference or a right-handed preference for operating the apparatus;
when the left-handed preference is determined, render a left-handed oblique view of the object on the display screen by rotating the object, when viewed by an observer along an axis within the display screen, to a counterclockwise direction by a pre-configured angle relative to the position of the display screen; and
when the right-handed preference is determined, render a right-handed oblique view of the object on the display screen by rotating the object, when viewed by an observer along the axis within the display screen, to a clockwise direction by the pre-configured angle relative to the position of the display screen,
wherein the input module and the output module comprise a touch screen, and the processor is configured to:
determine the preference setting based on a motion of a finger of a user with respect to the touch screen, and
determine the pre-configured angle to be proportional to a magnitude of the motion of the finger with respect to the touch screen.

16. The apparatus of claim 15, wherein:
the object comprises a plurality of simulated contact cards, and
the processor is further configured to render the contact cards in an oblique view according to the preference setting.

* * * * *